MARY H. ALEXANDER.
Wood-Pavements.
No. 135,460. Patented Feb. 4, 1873.
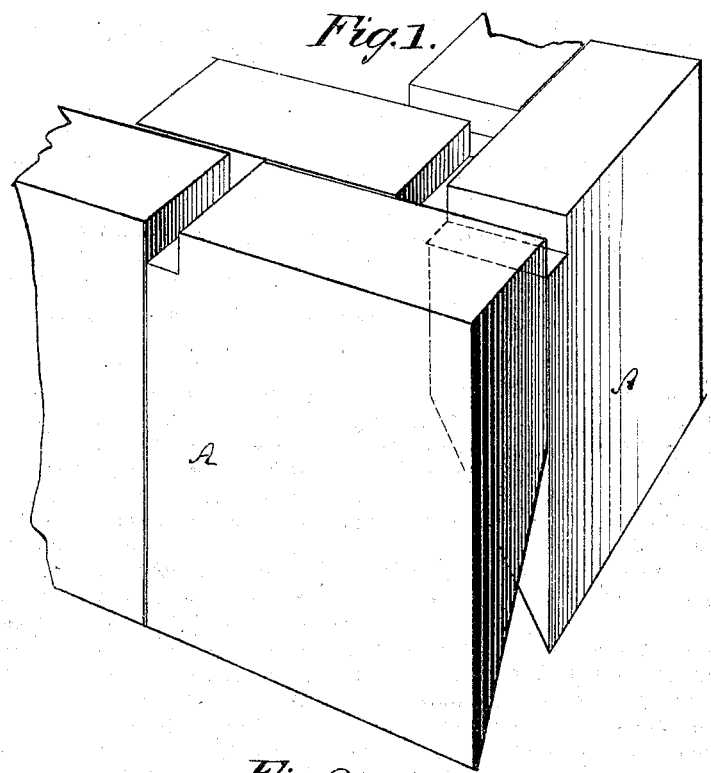
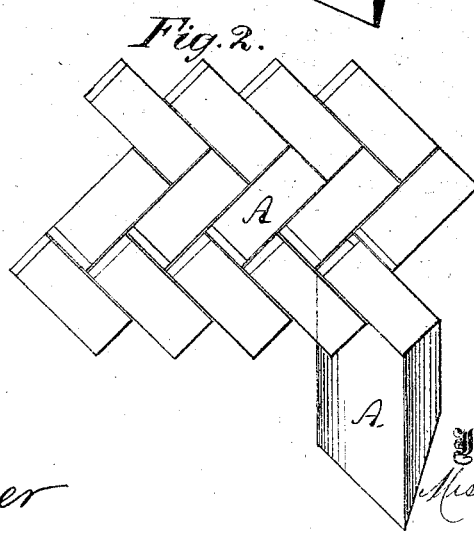

UNITED STATES PATENT OFFICE.

MARY H. ALEXANDER, OF NEWARK, NEW JERSEY.

IMPROVEMENT IN WOOD PAVEMENTS.

Specification forming part of Letters Patent No. 135,460, dated February 4, 1873.

*To all whom it may concern:*

Be it known that I, MARY H. ALEXANDER, of Newark, in the county of Essex and State of New Jersey, have invented a new and useful Improvement in Wooden Pavements; and I do hereby declare that the following is a full, clear, and exact description of the same, reference being had to the accompanying drawing forming a part of this specification, in which—

Figure 1 is a perspective view of my improved wooden pavement, and Fig. 2 a top view partly in perspective of the same.

This invention consists in making a pavement of a series of wedge-shaped blocks, flat on top, notched across one of the upper ends, and driven into the soil at right angles to each other, as hereinafter fully described and claimed.

A represents a series of wooden blocks, sharpened on the lower side, flat on the upper, and having a piece of triangular or other shape cut off from one corner.

One block is first driven into its allotted position, and then another placed at right angles thereto, the notched end of the latter being made to abut against the unnotched end of the former, as shown in the drawing. The purpose of this construction and application of the blocks is, that each one may be supported by another, braced lengthwise against each of its opposite ends. This not only forms a most secure and stable pavement, but one that can be laid down rapidly and at a comparatively low cost. The object of the corner notch is to bring the filling-spaces in small zigzags or right-angled triangles, and thus afford a good foot-hold without the necessity of cutting away the blocks too much or wasting the filling.

Having thus described my invention, what I claim as new and desire to secure by Letters Patent, is—

A paving-block, sharpened on the lower side and notched on one of the upper corners, as described.

MARY H. ALEXANDER.

Witnesses:
S. S. TIFFANY,
HENRY YOUNG.